(12) United States Patent
Emam

(10) Patent No.: US 11,768,521 B2
(45) Date of Patent: Sep. 26, 2023

(54) AUXILIARY MONITOR BRACKET FOR LAPTOPS

(71) Applicant: Kareim Emam, Fulton, MD (US)

(72) Inventor: Kareim Emam, Fulton, MD (US)

( * ) Notice: Subject to any disclaimer, the term of this patent is extended or adjusted under 35 U.S.C. 154(b) by 72 days.

(21) Appl. No.: 17/493,478

(22) Filed: Oct. 4, 2021

(65) Prior Publication Data

US 2022/0107669 A1 Apr. 7, 2022

Related U.S. Application Data

(60) Provisional application No. 63/208,352, filed on Jun. 8, 2021, provisional application No. 63/086,861, filed on Oct. 2, 2020.

(51) Int. Cl.
*G06F 1/16* (2006.01)
*F16M 13/02* (2006.01)

(52) U.S. Cl.
CPC ......... *G06F 1/1656* (2013.01); *F16M 13/022* (2013.01); *F16M 2200/068* (2013.01); *G06F 1/1616* (2013.01)

(58) Field of Classification Search
CPC .... G06F 1/1656; G06F 1/1616; G06F 1/1607; G06F 2200/1613; G06F 1/1637; G06F 1/1654; F16M 13/022; F16M 2200/068; F16M 2200/08; F16M 11/041; F16M 11/045; F16M 11/38

USPC ........................................................ 248/558
See application file for complete search history.

(56) References Cited

U.S. PATENT DOCUMENTS

| | | | |
|---|---|---|---|
| 6,758,454 B2 | 7/2004 | Smed | |
| 8,000,090 B2 | 8/2011 | Moscovitch | |
| 9,441,782 B2* | 9/2016 | Funk | ...................... F16M 13/00 |
| 9,523,461 B2 | 12/2016 | Kuan | |
| 10,180,209 B2 | 1/2019 | Bowman et al. | |
| 11,068,030 B2* | 7/2021 | Mareks, Jr. | ........... E05D 11/084 |
| 11,416,024 B2* | 8/2022 | Bryant | .................. G06F 1/1632 |
| 2009/0167632 A1 | 7/2009 | Han | |
| 2011/0247249 A1 | 10/2011 | Cao | |
| 2012/0280892 A1 | 11/2012 | Moscovitch | |
| 2017/0328517 A1* | 11/2017 | Wessels | ................. F16M 13/00 |
| 2020/0200322 A1* | 6/2020 | Marcks, Jr. | ........... G06F 1/1628 |
| 2022/0107669 A1* | 4/2022 | Emam | ................... F16M 11/041 |

OTHER PUBLICATIONS

Side Mount Clip on Monitor Magnetic Laptop Stand at https://www.amazon.com/dp/B088WZCZ3Q—Last visited Dec. 17, 2021.

* cited by examiner

*Primary Examiner* — Muhammad Ijaz

(57) ABSTRACT

A multi-display monitor bracket designed to allow a user to mount two auxiliary monitors to a laptop (or tablets or phones), plus a camera, and easily manipulate the angle of the monitors including rotation away from the user to allow another individual sitting across a table from the user to easily see what is on the laptop monitor. The bracket attaches by tongue-and-groove fit to a mounting plate adhered to the back face of a laptop.

18 Claims, 5 Drawing Sheets

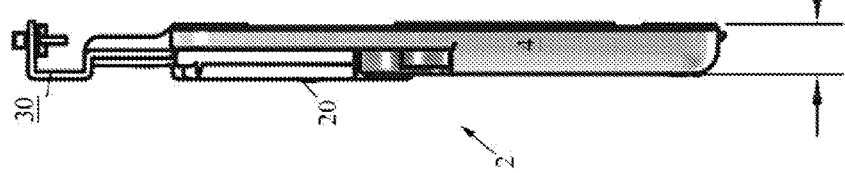
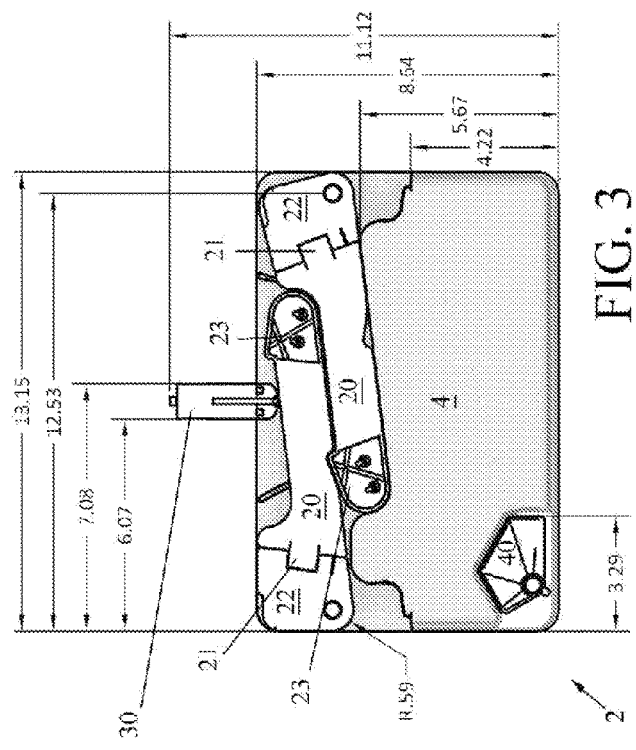
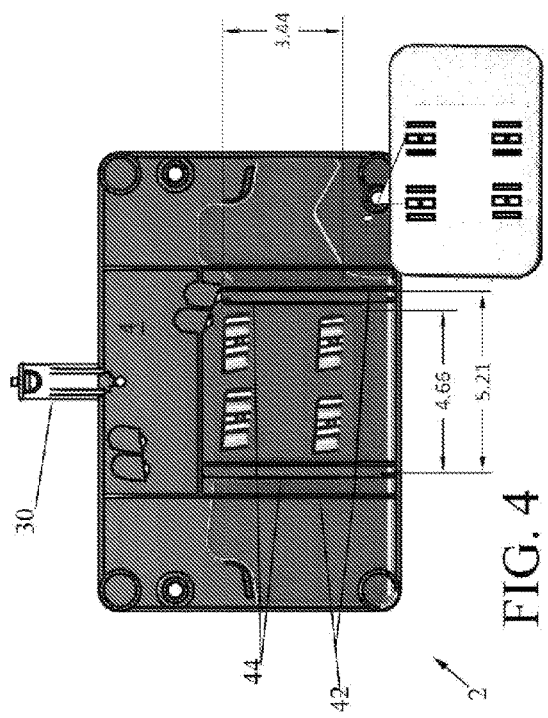

AUXILIARY MONITOR BRACKET FOR LAPTOPS

CROSS-REFERENCE TO RELATED APPLICATION(S)

The present application derives priority from U.S. provisional application Ser. No. 63/208,352 filed 8 Jun. 2021 and U.S. provisional application Ser. No. 63/086,861 filed 2 Oct. 2020.

BACKGROUND OF THE INVENTION

1. Field of the Invention

The present invention relates generally to brackets for mounting computer peripherals and, more particularly, to an auxiliary monitor bracket for removable attachment of additional monitors, tablets or phones in a variety of combinations or configurations to the back panel of a laptop.

2. Description of the Background

It is increasingly common for computer users to use multiple displays (e.g., monitors) as part of their workstations. This is because users are discovering the value of multi-monitor display systems in several different respects: multi-tasking, screen sharing, enhanced viewing. A variety of support frameworks have been developed for supporting the monitors in a multi-monitor system. For example, the general concept of a multiple-display bracket with articulating arms is known U.S. Pat. No. 8,000,090 to Moscovitch issued Aug. 16, 2011 shows a multi-monitor support stand with extensible arms. Pivoting coupling units are used to couple each monitor to the arms.

U.S. Pat. No. 10,180,209 to Bowman et al. (Innovative Office Products, LLC) issued Jan. 15, 2019 shows an expandable multi-display support apparatus with several display supports 170*a-c* slidably mounted along a jointed beam.

U.S. Pat. No. 9,523,461 to Kuan (Hon Hai Precision Industry Co., Ltd.) issued Dec. 20, 2016 shows a mounting device for three (3) screens with pivoting trapeziform panels mounted on flanking sides of a center panel. When one of the first panel member or the second panel member is rotated, the other is rotated at the same time and to the same degree by virtue of a linking assembly across the third fixing member.

U.S. Pat. No. 9,441,782 to Funk et al. issued Sep. 13, 2016 shows a tablet mounting arm system for mounting a tablet to a laptop or vice versa (see FIG. 2C). The device includes a plurality of extensible arms: a monitor portion 116 configured to support a display monitor 102: a tablet portion 118 configured to support a tablet 106.

U.S. Pat. No. 6,758,454 to Smed issued Jul. 6, 2004 shows a hub-and-spoke mounting bracket for mounting multiple devices to a flat panel display.

United States Patent Application 20110247249 by Cao (Hon Hai Precision Industry Co.) published Oct. 13, 2011 shows a double display structure with opposed displays mounted on slide rails so that the first display slides with respect to the second display.

United States Patent Application 20090167632 by Tai-Sheng Han (EVGA Corporation) published Jul. 2, 2009 shows a stand for supporting two monitors via a pair of pivot arms.

A person wishing to acquire a multi-monitor display system may already have a notebook computer. Unfortunately, none of the foregoing references are capable of removably mounting multiple portable monitors to the back of a laptop, or tablets or phones. It would be desirable to provide a universal monitor bracket that allows a user to removably mount two auxiliary display monitors in addition to a tripod mount for a camera to the rear enclosure of a laptop fully by tongue-in-groove slide plates.

SUMMARY OF THE INVENTION

It is an object of the invention to provide a universal monitor bracket to allow a user to removably but securely mount two auxiliary monitors, or tablets or phones to the rear enclosure of a laptop, as well as a-tripod adapter mount with ¼-20 screw adapter on top that can be utilized to attach a variety of devices or tools such as webcams, action cameras, circular lights, microphones, smaller brackets, etc.

It is another object to provide a laptop monitor that allows easy manipulation of the angle of the auxiliary monitors, including rotation away from the user to allow another individual sitting across a table from the user to easily see what is on the auxiliary monitor(s).

It is another object to provide an auxiliary monitor bracket as per above that stows completely flat against the rear of the laptop housing.

It is still another object to provide an auxiliary monitor bracket that removably, reliably and completely attaches by a tongue-in-groove slide plate, which slide plate is in turn attached to the rear of the laptop enclosure by double-sided adhesive pads.

In accordance with the foregoing objects, the invention is an auxiliary monitor bracket designed to allow a user to mount two auxiliary monitors to a laptop (or alternatively tablets or phones), plus a variety of other devices or objects vis-à-vis a ¼ inch tripod adapter mount atop the bracket, and easily manipulate the angle of the monitors, including rotation away from the user to allow another individual sitting across a table from the user to easily see what is on either auxiliary monitor. A mounting plate is attached to the rear of the existing laptop enclosure by double-sided adhesive pads. Four detent rails project from the rear of the mounting plate and capture a main panel, the main panel slidably attaching to the detent rails of the slide plate by a tongue-in-groove fit. The rear of the main panel is configured with a recess within which two pivoting arms are seated flush. The pivoting arms unfurl to each support one 3rd-party portable display monitor or other device. A mounting plate is likewise attached to the rear of each 3rd-party portable display monitor. The two pivoting arms of the auxiliary monitor bracket extend to smaller slide plates that similarly attach to the mounting plates on the back face of the 3rd-party portable display monitors by a tongue-in-groove fit. The arms and slide plates all fold neatly into the recess in the main panel and nest in a stowed position, or pivot outward for use in a deployed position. When deployed each arm pivotally extends outward from the side of the laptop to suspend the two 3rd-party portable display monitors flanking the laptop display. The device also includes an overhead mount for a camera, microphone, circular light or other attachments or devices that fit a standard ¼" tripod screw. As an alternative to attachment of the slide plates by adhesive pads the slide plates may be permanently attached to the respective 3rd-party portable display monitors and/or rear laptop display enclosure such as, for example, by integral molding at the time of manufacturing of the laptop and auxiliary monitors.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 3 is a front view of the removable slide plate 60 of FIG. 2.

FIG. 4 is a rear view of the removable slide plate 60 of FIGS. 2-3

FIG. 5 is a rear view of the multi-display monitor bracket of FIGS. 1-2 with exemplary molding dimensions for implementing the present invention.

FIG. 8 is a side perspective exploded-assembly view of the multi-display auxiliary monitor bracket of FIGS. 1-5.

FIG. 9 is a perspective assembly view of an exemplary constant-torque hinge.

DETAILED DESCRIPTION OF THE PREFERRED EMBODIMENT

Figure 1:
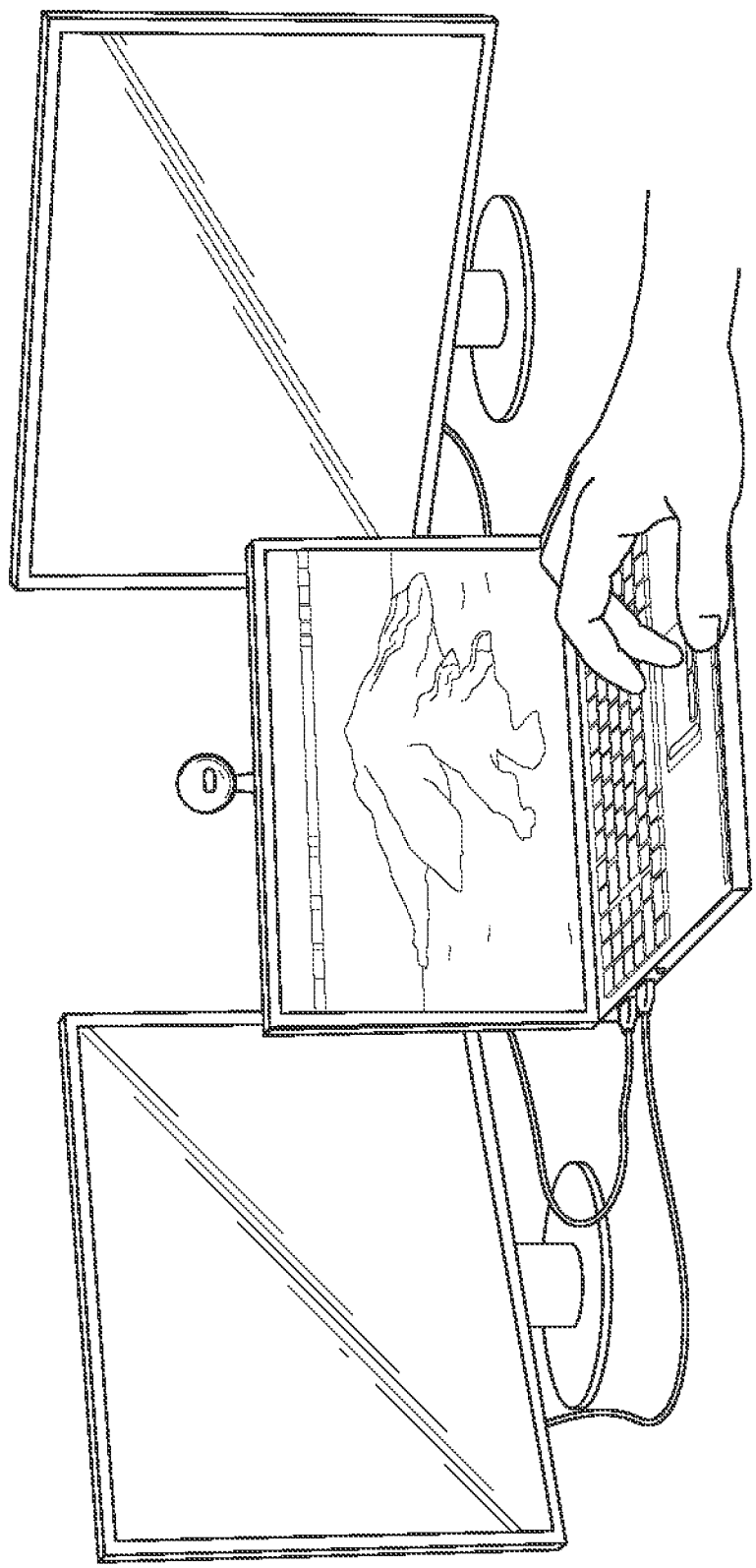
FIG. 1 is a front perspective view of a laptop with two flanking auxiliary monitors mounted to the rear enclosure of the laptop, and a webcam mounted overhead.

The present invention is a multi-display auxiliary monitor bracket that allows a user to removably mount two flanking auxiliary monitors, tablets or phones to the rear display-enclosure of a laptop, plus a webcam, microphone, smartphone or other device mounted overhead, all as illustrated in FIG. 1.

As seen in FIGS. 2-8, the multi-display auxiliary monitor bracket 2 includes a rectangular main panel 4 with rounded edges that generally conforms to the rear display-enclosure of a conventional laptop. The rear of the main panel 4 is substantially smooth to replicate the rear of a laptop display enclosure, but includes two recessed sections. The upper recessed section occupies the entire upper width of the main panel 4 and provides a recess for flush seating of a pair of pivoting and extendable support arms 20 that fold inward and nest into the upper recess of main support panel 4. The two symmetric pivoting support arms 20 unfold 180 degrees from behind the main panel 4 from the stowed position (FIGS. 2-3) to a fully deployed position (FIG. 8) and can be adjusted to any angle there between. In addition, the two pivoting support arms 20 are each telescopically-extendable approximately two inches and can be deployed and locked in place in a fully retracted position (FIG. 2) or fully extended position, or adjusted to any extension there between. Each support arm 20 extends inward from a distal hand 23 to a widened base 22 and is hinged to base 22 by a 180-270 degree delimited hinge 21 to be described. Importantly, the axes of the hinges 21 are not parallel, but rather offset toward each other from parallel by a slight acute angle, preferably 5 degrees canted inward and within an acceptable range of from 2-10 degrees. This way, the arms 20 open upward slightly and raise the hands 23 to approximately the top of the main support panel 4, providing two extended arms 20 that diverge from the sides of the main support panel 4 at inside obtuse base angles α having the same measure, preferably within a range of from 95-145 degrees, most preferably within a range of from 95-110 degrees, optimally at 100 degrees. The bases 22 may be screwed, adhered or molded to the main support panel 4 flush within the upper corners of the upper recess. In consequence the two arms 20 are of equal length, have reflection symmetry, and nest against each other within the upper recess when stowed. Each extended arm 20 extends outward in the deployed position approximately six inches, but the hands 23 include extensions that are telescopically inserted into locking collars 29 for an additional two inches of extension therefrom. The locking collars 29 include detent buttons that lock hands 23 at any desired extension.

Figure 2:
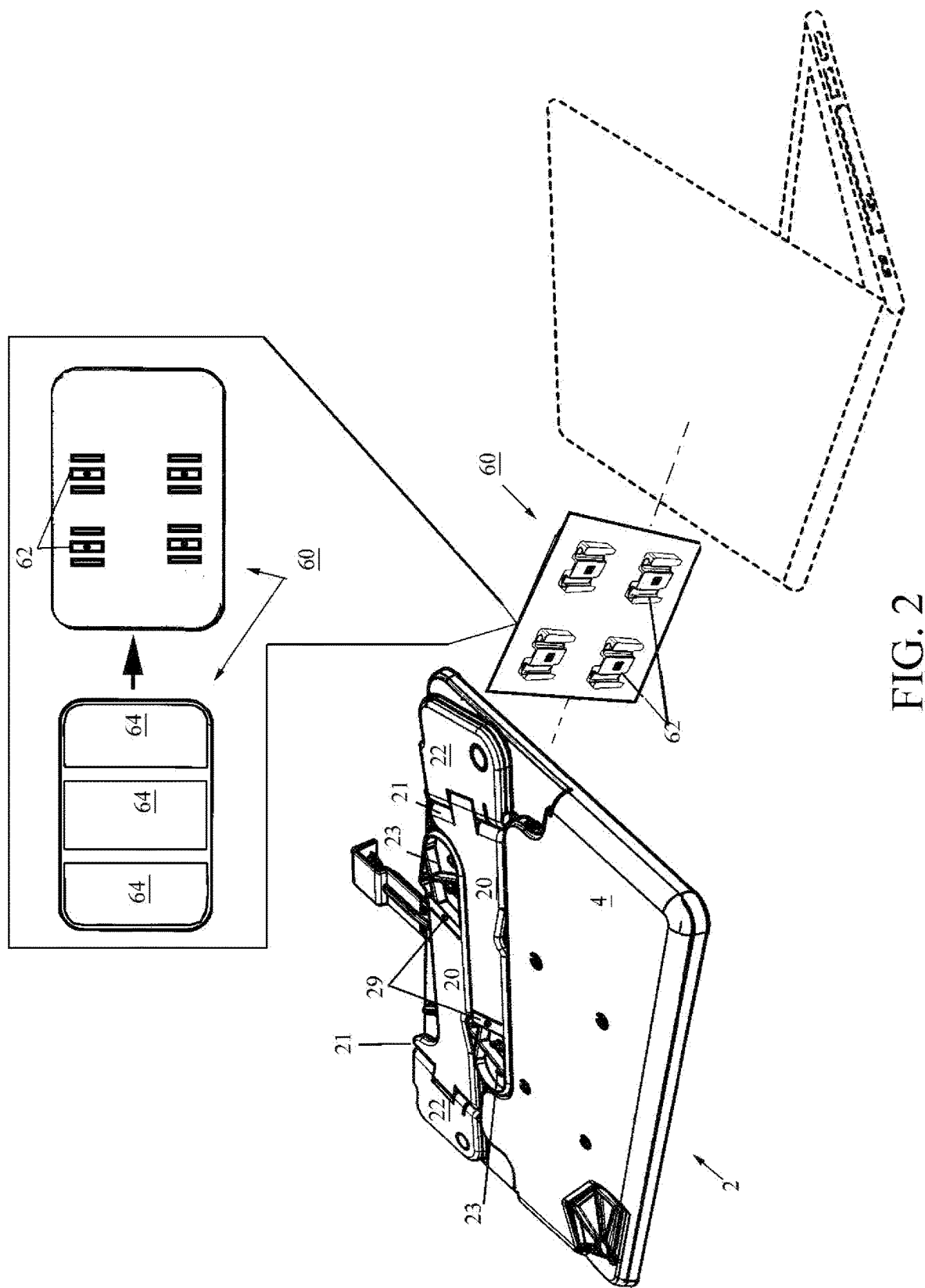
FIG. 2 is a rear perspective exploded view of a multi-display auxiliary monitor bracket suitable for removably mounting two flanking auxiliary monitors (or tablets or phones) to the rear display-enclosure of a laptop as per FIG. 1.

As seen in the leftmost inset of FIG. 8, each extended hand 23 is preferably configured with a removable slide plate 27 that attaches by tongue-and-groove insertion into a slide receptacle 25 comprising two grooves formed in the palm of the hand 23 at the end of respective arms 20. The slide plates 27 have a flat front surface that is attached by adhesive pads 64 to the rear of the auxiliary monitor. The pads may be permanent double sided adhesive pads such as 3M® double sided VHB® pads. Each removable slide plate 27 presents projecting rear rails 28 that run vertical and are keyed to the grooves of the slide receptacle 25 at the end of respective arms 20 to allow vertical sliding insertion yet prevent lateral removal, the rails 28 fitting tongue-in-groove into the grooves of slide receptacle 25. This way, each auxiliary monitor can be slidably inserted and/or removed from the respective arm 20. The slide receptacles 25 at the end of respective arms 20 may also include a VESA interface mounting standard pattern of holes and/or thumbscrews for attachment. The removable slide plates 27 of each support arm 20 removably attaches a portable auxiliary display monitor ranging in standardized size from 13.3" to 15.6", a wide variety of such monitors being commercially available. As seen in FIG. 2 the support arms 20 are hinged to one side of the backside of the main panel 4 by a pair of angle-delimited torque hinges 21 with oval ends. One side of hinge 21 is recessed into the widened base 22 and affixed thereto, and the other side of hinge 21 is recessed into the distal end of arm 20 and affixed thereto.

FIG. 9 is a perspective assembly view of an exemplary torque hinge 21. Torque hinge 21 comprises a spaced pair of cooperating joints 211a, 211b engaged together and held by a pin carried there between. Joint 211a is seated down flush into an open-ended recess in base 22 and fastened therein by a pair of screws, while joint 211b is seated down flush into an open-ended recess at the end of arm 20 and likewise screwed therein. One skilled on the art will understand that plastic hinges 21 may be used and may be plastic-welded or otherwise adhered in place. Torque hinge 21 is preferably a constant torque friction hinge that presents a constant friction throughout its full range of motion, preferably within a range of from 2-8 N-m. The monitor bracket according to claim 1, wherein the hinges of said pair of support arms are limited to a fixed pivot angle within a range of from 180-270 degrees. A variety of suitable plastic or metal hinges are commercially available from, for example, Reell Precision Manufacturing Corp. sold under their ReellTorq® brand. The joints 211a, 211b are pivotally engaged for delimited pivoting, preferably limited to a fixed angle within a range of from 180-270 degrees. The hinges 21 pivotally attach the arms 20 to their respective bases 22 and impart a set pivoting resistance.

Referring back to FIGS. 2-6 and 8 a removable slide plate 60 is adhered to the laptop enclosure and the main support panel 4 fits onto the slide plate 60 by tongue-and-groove insertion. The slide plate 60 has a flat front surface that is attached by adhesive pads 64 to the rear of the laptop enclosure. Again the pads 64 may be permanent double sided adhesive pads. As seen in the bottom inset of FIG. 6, the slide plate 60 presents four sets of raised tracks 62 that run vertical and are keyed to slotted receptacles 67 in the backside of the main support panel 4 to allow vertical sliding insertion yet prevent lateral removal, the tracks 62 fitting tongue-in-groove into the slotted receptacles 67 formed in main support panel 4. This way, the entire auxiliary monitor bracket 2 can be slidably inserted and/or removed from the rear of the laptop. Preferably, the four sets of raised tracks 62 also contain screw holes conforming to a VESA interface mounting standard pattern for permanent fixed attachment, if desired.

As seen in FIG. 5 the lower recessed section in the backside of the main support panel 4 occupies the lower left corner of the main support panel 4 and provides a pentagonal recess for flush seating of a pentagonal kickstand 40 that pivots downward from main support panel 4. Pentagonal kickstand 40 is pivotally attached within the lower recess of the main support panel 4 at a point offset from its geometric center and thereby provides three different vertical kickstand heights user-selectable by degree of rotation of kickstand 40.

In addition, as seen in the top inset if FIG. 8 a removable tripod adapter mount 30 is slidably attached to the top center of the main support panel 4, also by tongue-in-groove fit. When inserted into the main support bracket 4 the tripod adapter mount 30 extends upward slightly and presents a standard ¼-20 screw adapter for mounting a camera, webcam, microphone, circular light or any other attachments/devices that fits a standard ¼" camera tripod screw.

Figure 6:
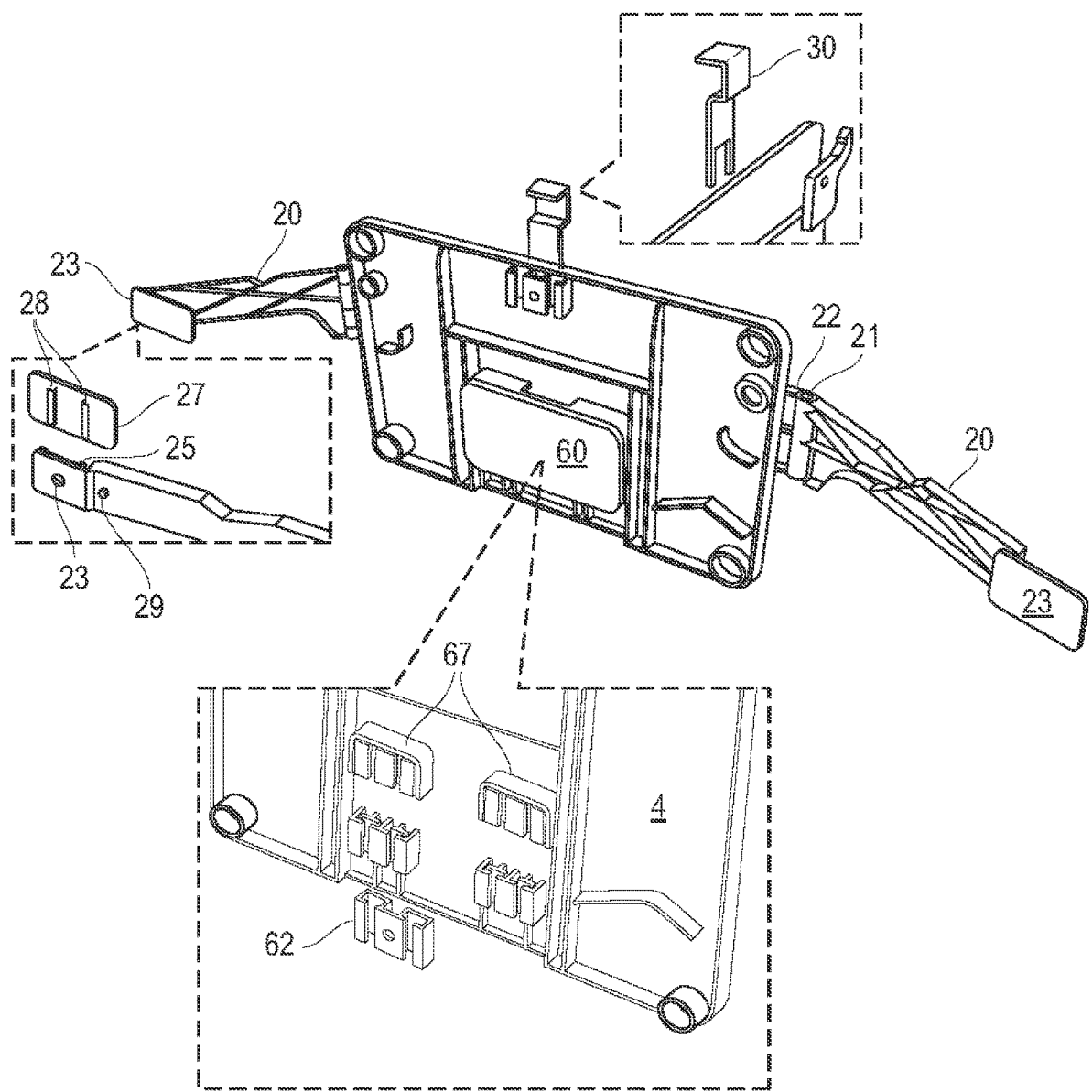
FIG. 6 is a front unattached view of the multi-display auxiliary monitor bracket of FIGS. 1-3.
Figure 7:
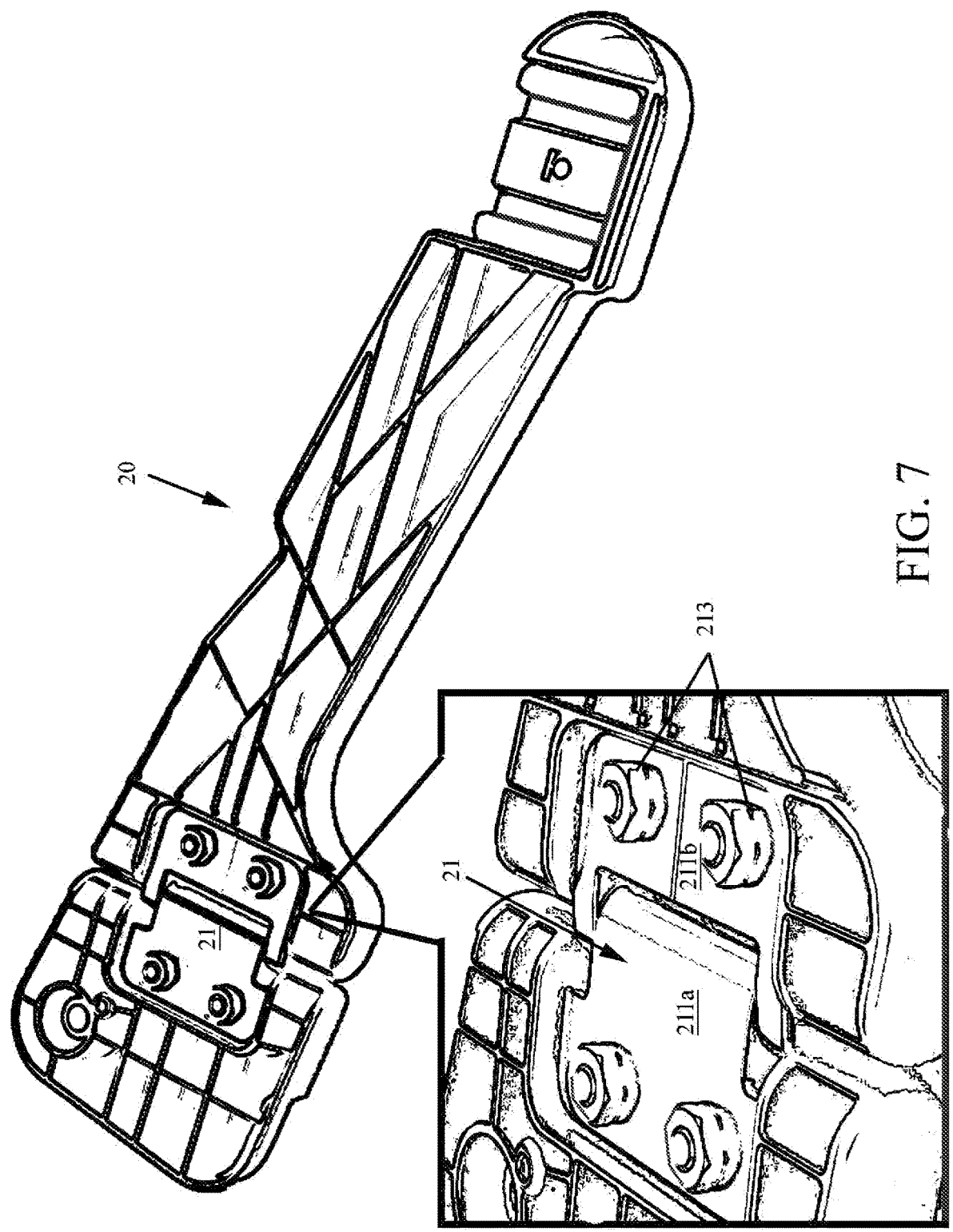
FIG. 7 is a side perspective view of the multi-display auxiliary monitor bracket of FIGS. 1-4.

The foregoing configuration facilitates injection-molding of the main panel 4 with all recesses defined in the backside of the main panel 4 as seen in FIG. 5. The inside of the injection-molded main panel 4 as seen in FIG. 6 is substantially concave but with a pattern of reinforcing ribs 42, 44 formed inside the concave frontside of the main panel 4 to reinforce the panel 4.

In use, a user will adhere the slide plate 60 to the rear display-enclosure of their laptop, and attach a slide plate 21 to the rear of each auxiliary monitor. The arms 20 are then extended outward, and the two portable monitors are slidably inserted into the slots in arms 20. A webcam or other device may be attached to overhead mount 30. The user may then adjust the viewing angles by pivoting support arms 20 to their desired position.

As indicated above, the arms 20 are preferably extendable by telescoping sections. This is accomplished by mounting hands 23 on extensions that fit within and are telescopically extendable from distal sockets and secured by locking collars 29 for an additional two inches of extension therefrom. The locking collars 29 preferably include detent buttons or compression screws to lock hands 23 at any desired extension. This allows the two pivoting support arms 20 to be deployed, telescopically-extended approximately two inches and locked in place at any desired extension.

An optional feature includes a pivot joint at the wrist of each extended hand 23, which may be locking or not. This would allow pivoting each hand 23 and hence each monitor for angular positioning at the end of respective arms 20.

In addition, a portable battery pack may be integrated in the hexagonal recess of main panel 4 for powering the monitors and/or laptop.

In still another alternative to attachment of slide plate 60 by adhesive pads, the slide plate 60 may be permanently formed in the rear of the laptop display enclosure at the time of laptop manufacture. Moreover, one skilled in the art will also understand that the entire main panel 4 can be built integrally in the laptop enclosure (rather than attached to it) without departing from the scope of the invention. The pair of pivoting arms 20 would deploy from the rear panel in the same above-described manner.

In all such embodiments it should now be apparent that the auxiliary monitor bracket 2 of the present invention reliably, removably and completely attaches by tongue-and-groove insertion to slide plate 60, and it and the arms 20 stow completely flat against the laptop monitor housing. When deployed the arms 20 allow easy tongue-and-groove insertion of auxiliary monitors, and allow manipulation of the angle of the portable monitors, including rotation away from the user to allow another individual sitting across a table from the user to easily see what is on the laptop monitor.

Although the present subject matter has been described with reference to specific exemplary embodiments, it will be evident that various modifications and changes may be made to these embodiments without departing from the broader spirit and scope of the subject matter. Accordingly, the specification and drawings are to be regarded in an illustrative rather than exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A monitor bracket for mounting a plurality of accessories to a rear enclosure of a laptop, comprising:
a main panel formed with a substantially flat frontside and recessed backside having an upper recess;
a pair of pivoting support arms, each support arm of said pair of pivoting support arms being defined by an elongate arm mounted at a hinge attached within the upper recess of the main panel such that said pair of pivoting support arms seat flush inside said upper recess and nest against each other when in a stowed position.

2. The monitor bracket according to claim 1, wherein said main panel is rectangular with rounded edges.

3. The monitor bracket according to claim 1, wherein each of said pair of pivoting support arms comprises a distal hand at one end of said elongate arm and a polygonal base at another end of said elongate arm.

4. The monitor bracket according to claim 1, wherein the hinges of said pair of support arms pivot about axes that are angularly offset from each other by an acute angle.

5. The monitor bracket according to claim 4, wherein said acute angle is within a range of from 2-10 degrees.

6. The monitor bracket according to claim 1, wherein the hinges of said pair of pivoting support arms comprise butt hinges.

7. The monitor bracket according to claim 1, wherein the hinges of said pair of support arms are limited to a fixed pivot angle within a range of from 180-270 degrees.

8. The monitor bracket according to claim 1, wherein the hinges of said pair of support arms are constant torque.

9. The monitor bracket according to claim 1, wherein said pair of pivoting support arms are each extendable.

10. The monitor bracket according to claim 1, each of said pair of pivoting support arms comprises a distal hand wherein each said hand comprises a removable slide plate attached by tongue-and-groove insertion into a slide receptacle at the end of respective arms.

11. A monitor bracket for mounting a pair of auxiliary display monitors to a rear display enclosure of a laptop, comprising:
- a main panel formed with a substantially flat frontside configured for attachment to the rear display enclosure of said laptop, said main panel having a backside formed with an upper recess;
- a pair of support arms pivotally attached to said main panel on opposing sides of said recess, each support arm of said pair of pivoting support comprising an elongate arm attached at one end by a hinge within the recess on the backside of said main panel, said pair of pivoting support arms configured to pivot from an open extended position to a closed stowed position seated flush within the recess of the main panel and nested together when in said closed stowed position.

12. The monitor bracket according to claim 11, wherein said main panel is rectangular with rounded edges.

13. The monitor bracket according to claim 11, wherein each of said pair of support arms comprises a distal hand at one end of said elongate arm and a trapezoidal base at another end of said elongate arm.

14. The monitor bracket according to claim 11, wherein the hinges of said pair of support arms pivot about axes that are angularly offset from each other by an acute angle.

15. The monitor bracket according to claim 14, wherein said acute angle is within a range of from 2-10 degrees.

16. The monitor bracket according to claim 11, wherein the hinges of said pair of support arms are limited to a fixed pivot angle within a range of from 180-270 degrees.

17. The monitor bracket according to claim 11, wherein the hinges of said pair of support arms are constant-resistance torque.

18. The monitor bracket according to claim 11, each of said pair of pivoting support arms comprises a distal hand wherein each said hand comprises a removable slide plate attached by tongue-and-groove insertion into a slide receptacle at the end of respective arms.

* * * * *